United States Patent [19]
King, Sr.

[11] Patent Number: 5,429,404
[45] Date of Patent: Jul. 4, 1995

[54] FLEXIBLE STRIP MAGNETIC GOLF CART

[76] Inventor: Lloyd H. King, Sr., 400 SeaSage Dr., Unit 1006, Delray Beach, Fla. 33483

[21] Appl. No.: 206,410

[22] Filed: Mar. 7, 1994

[51] Int. Cl.[6] .............................................. B60J 5/04
[52] U.S. Cl. ........................ 296/79; 296/146.9; 296/145; 296/77.1; 160/349.1; 160/DIG. 16; 280/DIG. 5; 292/251.5
[58] Field of Search ............. 296/77.1, 79, 146.9, 296/138, 145; 292/251.5; 160/332, 349.1, 327, 184, DIG. 16; 280/DIG. 5

[56] References Cited

U.S. PATENT DOCUMENTS

| | | | |
|---|---|---|---|
| 1,472,651 | 10/1923 | Holling | 296/138 |
| 1,482,458 | 2/1924 | Brunsman | 296/138 |
| 4,355,678 | 10/1982 | Romano | 160/332 |
| 4,372,262 | 2/1983 | Kaniut | 74/7 C X |
| 4,652,037 | 3/1987 | Thau et al. | 296/77.1 |
| 4,669,766 | 6/1987 | Hanchett, Jr. et al. | 292/251.5 |

FOREIGN PATENT DOCUMENTS

| | | | |
|---|---|---|---|
| 1154246 | 9/1963 | Germany | 160/DIG. 16 |
| 8706296 | 10/1987 | WIPO | 292/251.5 |

*Primary Examiner*—Dennis H. Pedder
*Attorney, Agent, or Firm*—Jacobson & Johnson

[57] ABSTRACT

A golf cart enclosure system for the creation and maintenance of a pleasant climate within a golf cart during poor weather conditions and for allowing simultaneously care-free ingress and egress with respect to the golf cart without the golfer having to open a door on the golf cart, with the enclosure system including flexible partable strips of see-through plastic which extend across the vertical dimension between the golf cart canopy and the golf cart body, the top ends of the flexible strips being attached with a semi-permanent attachment device to the golf cart canopy in a rear-to-front overlapping fashion, so that during forward motion of the cart, the strips remain in position and in contact with one another; the bottom ends of the strips connected to the golf cart body by permanent magnets, or electromagnets wired to the golf cart battery and activated either automatically by the driver's footpedal, or by an on-board switch, with the enclosure system also including a front and back protective panel, the front panel being either one whole or partable transparent piece, and the back being either one whole or partable transparent piece allowing golfers to extend their golfing seasons.

7 Claims, 2 Drawing Sheets

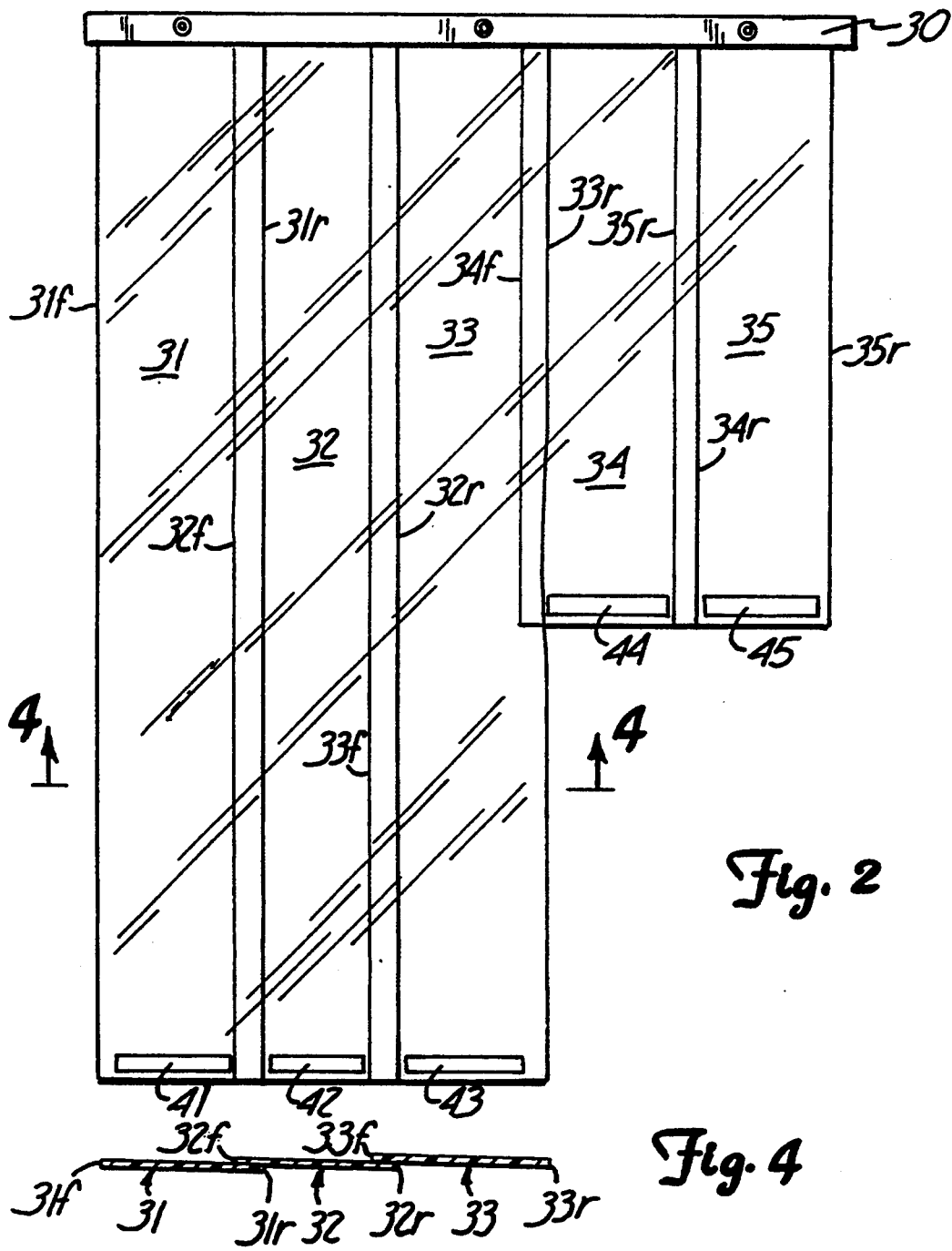

FLEXIBLE STRIP MAGNETIC GOLF CART

BACKGROUND OF THE INVENTION

In climates where the weather varies greatly among the seasons of the year, golfing can be made difficult by cold, rainy, or other inclement conditions. Often these conditions are not in themselves prohibitive of playing a successful round of golf, however, provided that the golfers remain comfortably warm and dry during the time intervals between shots.

Most previous attempts for providing a climate-controlled environment for golfers have centered on enclosing or protecting the golf can, it being a means for transportation as well as providing some shelter. One such method is simply the attachment of a canopy over the top of the can to inhibit rain or excessive sunlight from entering the golf cart. Though effective in mild weather aberrations, the canopy is not sufficient to protect golfers from truly poor conditions, which may include blowing rain or cold air.

Another method designed to protect golfers in golf carts includes the use of a large cover of water-repellent, flexible plastic, which is draped over the entire cart in anticipation of poor weather conditions. The cover includes a clear plastic windshield to preserve forward visibility, and a zippered slit in one or both sides to allow for golfers' entry and exit. The limitations of this method, however, are that visibility is substantially reduced because of the nature of the flexible plastic used, access to the cart is made much less convenient because of the need to zipper and unzip the slit opening in the side, and the cover, because of its disadvantages, is preferably removed each time the rain or cold weather conditions subside. In addition the zippers are prone to breakage if the golfer does not completely open the zipper when entering or leaving the golf cart.

The current invention also creates a protected environment for golfers within a golf cart, but offers major improvements on previous methods: the current invention maintains the visibility of the golfers while inside the golf cart and thus preserves the quality of their golfing experience, greatly improves the convenience of getting into and out of the golf cart as well as of removing clubs from the cart, if they are stored inside, and is a durable yet removable means for quickly attaching or removing from the golf can to accomplish these ends.

DESCRIPTION OF THE PRIOR ART

U.S. Pat. No. 3,827,019 shows a magnetic closure device installed along the border of a first flexible member and a second flexible or inflexible member, comprising two series of spaced permanent magnets, placed along the borders of both members, and beginning at the point of their contact.

U.S. Pat. No. 3,913,958 shows an electromagnetic door holder having a wall-mounted electromagnet and a door-mounted armature member.

U.S. Pat. No. 4,095,642 shows a plastic strip door having plastic strips which are suspended in a doorway in an overlapping fashion to minimize heat transfer through the doorway but allow uninhibited physical movement therethrough.

U.S. Pat. No. 4,098,536 shows a weathershield for golf cans comprising a large cover of water-repellent, flexible plastic which can be temporarily installed over a golf can in case, of poor weather conditions, but maintain access to the cart by means of a slit in the side of the plastic cover.

U.S. Pat. No. 4,133,574 shows a guard-cab for cold room operation which provides an enclosed, electrically heated cab for use with electric lift Bucks in colder indoor environments.

U.S. Pat. No. 4,296,792 shows a transparent reach-through .curtain for open refrigerators comprising overlapping, flexible, plastic strips suspended vertically across the opening of a display type open refrigerator to minimize heat transfer into and out of the refrigerator.

U.S. Pat. No. 4,454,904 shows a strip curtain for display cases comprising flexible, plastic strips suspended vertically across the opening of a display case by means of rigid plastic mounting members, which slidingly receive specially designed bead formations at the ends of the plastic strips, and which are then in-turn received by elongated rigid plastic grooves anchored to the top and bottom of the display window in the display case.

U.S. Pat. No. 4,607,678 shows a flexible strip door assembly comprising flexible, plastic strips suspended vertically in a doorway by means of an extrusion having an elongated, wall-mounted groove which slidingly receives the individual clamps connected to the top portions of the plastic strips by means of a nut and washer.

BRIEF SUMMARY OF THE INVENTION

A golf cart enclosure system for the creation and maintenance of a pleasant climate within a golf cart during poor weather conditions and which allows for care-free ingress and egress with respect to the golf cart without having to first open a door to the golf cart. The enclosure system comprises flexible strips of plastic which extend lengthwise across the vertical dimension between the golf cart canopy and the golf cart body, the top ends of the flexible strips being attached with a semi-permanent attachment device to the golf cart canopy in a rear-to-front overlapping fashion, so that during forward motion of the cart, the strips remain in position and in contact with one another, and the bottom ends of the strips being connected to the golf cart body by means of permanent magnets, or electromagnets wired to the golf cart battery and activated either automatically by the driver's footpedal, or by an on-board switch. The enclosure system also includes a front and back protective panel, the front panel being one whole and indivisible transparent piece, and the back being either one whole and indivisible piece, or a second set of flexible strips, aligned in the similar overlapping fashion to those on the sides of the cart, and attached by the same semi-permanent and magnetic means. Thus, the enclosure system provides a comfortable climate within the cart during poor weather conditions, allowing golfers to extend their golfing seasons.

BRIEF DESCRIPTION OF THE DRAWINGS

FIG. 2 is a side view of the plastic strips used my golf cart enclosure:

FIG. 4 is a cross sectional view of flexible strips arrangement along lines 4—4 of FIG. 2; and FIG. 5 is a top partial cut away view of the golf cart enclosure and golf cart canopy.

DESCRIPTION OF THE PREFERRED EMBODIMENT

Figure 1:
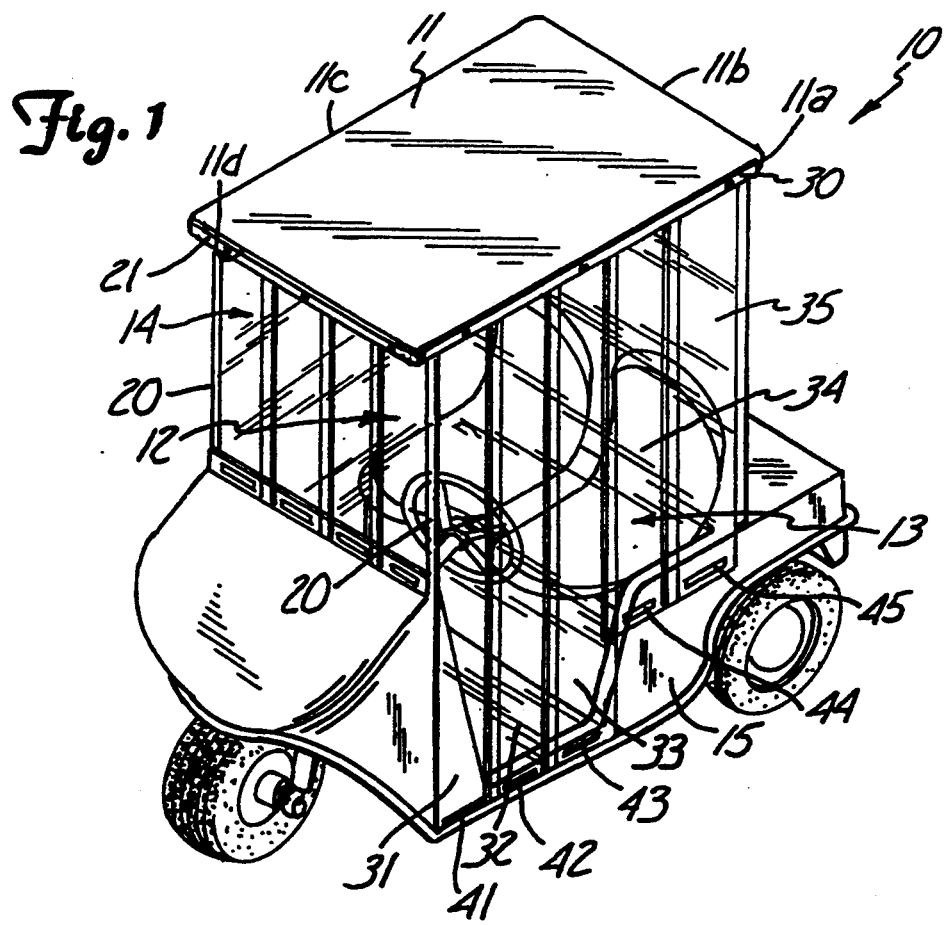
FIG. 1 is a perspective view of the golf cart enclosure of my invention.

FIG. 1 shows a conventional golf cart equipped with the present invention. The preferred embodiment of the present invention comprises a front panel 12, a back panel 10, and two side panels 13 and 14 comprised of a plurality of strips, as well as a magnetic apparatus, which together create a closed and controlled environment within the golf cart that a person can entry or exit without having to open a door.

FIG. 1 shows a golf cart canopy 11, supported by four canopy supports or posts 20. A clear plastic front panel 12 is attached to the golf cart canopy front edging 11d, by means of a front mounting strip 21, and is secured to canopy supports 20 and a golf cart body 15 to hold front panel in place when driving the golf cart.

FIG. 2 shows a side view of the flexible see-through plastic strips 31,32,33,34,35. Typically, see-through plastic strips are made from a material such as polyethylene vinyl. Each side of the cart is enclosed by a symmetrically identical set of strips 31–35. The strips 31–35 of panel 13 are semi-permanently mounted to the golf cart canopy side edging 11a by means of a side mounting strip 30. The strips 31–35 are configured in length to the distance between the golf cart canopy side edging 11a and the golf cart body 15 below. At the bottom end of the plastic strips 31–35, there are embedded metal bars 41–45. These bars may be permanent magnets, and are aligned such that they are capable of contacting the corresponding metal bars or electromagnets attached to the golf cart body 15. As an alternate embodiment one could use flexible magnetic strips or magnetic attractable strips.

The plastic strips 31–35 of FIG. 2 are arranged in an overlapping fashion as shown in FIG. 4. FIG. 4 shows a first strip 31 comprising three different parts, a from part 31f, a middle part, and a rear part 31r. Strips 32 and 33 are labeled in FIG. 4 in the same fashion. The top edges of the strips are attached to the golf cart canopy side edging 11a by means of the mounting strip 30 such that the front part of each of the strips (32f–35f) is overlapped by the rear part (31r–34r) of the preceding strip, with the rear part (31r–34r) overlapping on the outward side of the golf cart respective of which side the plastic strips are located. The overlapping of the strips 31–35 prevents the air from entering between the strips and extending them outward as the golf cart moves forward. In order to prevent air from entering under the front of strip 31, the front edge of strip 31 may be secured to golf cart body 15 through a metal bar and magnet combination as used on the bottom ends of strips 31–35.

Figure 3:
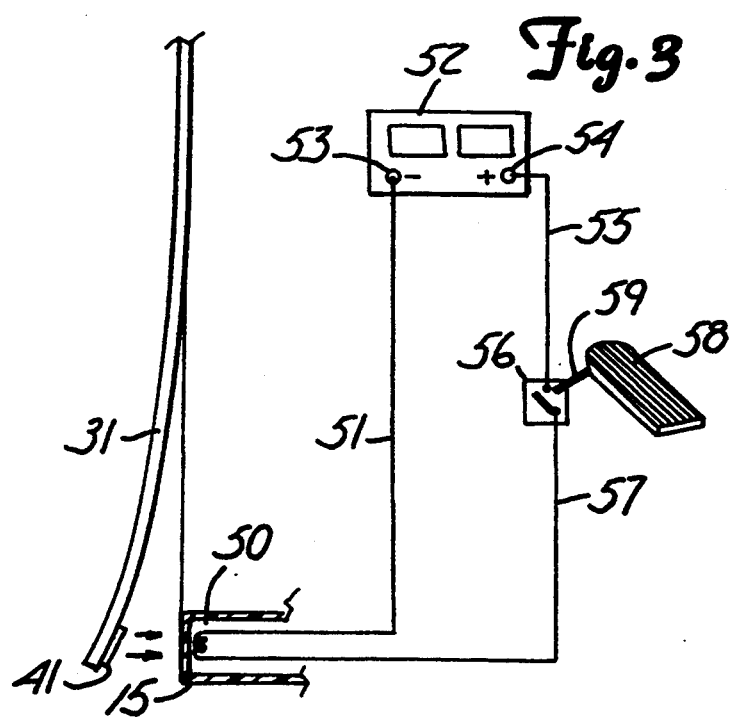
FIG. 3 is a schematic view of the electromagnetic circuitry in my invention.

The plastic strips 31–35 of FIG. 2 contain metal bars or strips of iron oxide embedded in a carrier 41–45, and rely upon an electromagnetic device to attract the plastic strips 31–35 to the golf cart body 15. The preferred embodiment of an on-board electromagnetic circuit is shown in FIG. 3. FIG. 3 shows an electromagnetic coil 50 mounted on the golf cart body 15. The coil 50 is wired via a wire 51 to a negative pole 53 on a golf can battery 52. A positive pole 54 on the golf can battery 52 is wired via a second wire 55 to a switch 56. The switch 56 is wired via a third wire 57 to the electromagnetic coil 50, and is also mechanically connected by means of a lever or similar attachment 59 to the accelerator pedal 58 in the golf cart. When the accelerator pedal 58 is depressed, it closes switch 56 and sends current through the electromagnetic coil 50, creating an attractive force which pulls the metal bars 41–45 firmly into contact with the can body 15. As the metal bars are drawn into contact with the body of the golf cart the flexible strips are drawn into the lapped arrangement shown in FIG. 2. As an alternate embodiment, the metal bars 41–45 can be installed as strong permanent magnets, and simple metal bars can be substituted on the golf cart body 15, opposite the permanent magnets 41–45, and in-place of the electromagnetic coil 50 and circuity 51–59. In this embodiment greater force would be required to move into and out of the canopy since the magnetic attraction between the strips and the golf cart body would have to be overcome by the user pushing the panels aside.

FIG. 5 shows a top cut away view of a corner of the golf can canopy 15. FIG. 5 shows in greater detail how the plastic strips 31–35 are attached by means of a mounting strip 21 to each canopy side-edging 11d & 11a. The mounting strip 30 is secured to the golf cart canopy 15 with of a number of bolts or similar attaching devices 38. FIG. 5 also shows the front panel mounting strip 21, which is attached to the canopy front edging 11d in a similar fashion with bolts 39. The rear one-piece panel 10 attaches to the canopy rear edging 11b also in an identical manner. In an alternate embodiment, the rear panel comprises flexible strips, and the strips will be attached to the rear canopy edging 11b by means of a rear mounting strip 30 in a similar overlapping fashion to that of the side strips 31–35. In the case of the rear panel, the direction of overlap is not important since the front of the cart prevents the air currents from separating the hanging flexible panels. While the front panel is shown as being comprised of multiple strips, it could be made of a single strip.

Because of the semi-permanent means of attachment, represented by mounting bolts 38 & 39, the present invention can be quickly installed upon the golf cart when weather conditions are inclement, and quickly removed when they become better. The golf pro or course caretaker need only bolt the mounting brackets holding the front panel, side panels, and rear panel to the golf cart canopy, and the enclosure system is operational. The electromagnetic system can be left on the cart since it is hidden and does not interfere with other operations of the cart.

In use of the invention with partable strips in the rear panel, the golfer can easily store the golf clubs by spreading the rear strips and setting the golf cart bags in their holders. In the invention with the single strip in the back panel, the golfer can store the clubs through the partable strips. The golfer then climbs into the golf cart, with the action of the golfer entering or leaving spreading aside the plastic strips. When the golfer depresses the accelerator pedal 58 inside the cart, the electromagnetic apparatus 50–59 located on the cart body 15 is activated by means of a mechanical connection 59 to the on-board switch 56. Activation causes the metal bars 41–45 to be attracted to the sides of the cart body 15, and pulls strips 31–35 into smooth and overlapped conformity to form a barrier between the inside and outside environments. This barrier preserves a dry, warm, and overall comfortable environment for the golfers inside the cart until they stop again.

When the accelerator 58 is released, and the cart motor stops, the electromagnetic device 51–59 is deactivated to automatically free the plastic strips 31–35 so a convenient exit from the cart can be made. In the case where the alternate embodiment is used, and the magnetic apparatus comprises permanent rather than electromagnets, access is easily obtained by applying a small amount of pressure to the plastic strips with the golfer's foot or hand. When the magnets release the strips 31-35 from the golf cart body 15, the golfer can enter or exit the can according to desire.

An advantage of the flexible strip configuration in the present invention is that forward, side, and rear visibility are much better preserved than they are with previous methods of golf cart environmental control since the entire golf cart enclosure can be made of see-through plastic strips. Golfers therefore obtain a maximum amount of comfort, for a minimum amount of inconvenience, either in terms of boarding or exiting the golf cart, or in terms of visibility while inside the golf cart. An additional advantage is that since the relative inconvenience of having the present invention attached to the cart is fairly low, golf pro shops or course caretakers need not worry about removing the enclosure system each and every time conditions seem to warrant it. The present invention can be left in place, for example, throughout a rainy or cold day, even if there are periods of sun and warmth in between.

Thus the present invention shows an enclosure system for preservation of pleasant climate conditions inside a golf cart in poor weather conditions yet permits quick entry and exit to the golf cart by use of a panel for covering an opening in a golf cart for quick ingress and egress into and out of the golf cart. The panel includes a plurality of flexible strips that are partable by the action of a golfer moving into or out of the golf cart, but which are normally held in a closed position during motion of the golf cart. By permitting the quick release of a portion of the flexible strips, the present invention allows the golfer to enter or exit through the panel without having to expend time or energy opening it.

While the invention is shown with four panels that can be attached to the golf cart, the system can also be used with golf carts that have an integral windshield or a permanent back panel. In such an event only the side panels need to be attached to the canopy to provide the enclosure.

I claim:

1. An enclosure system for preservation of pleasant climate conditions inside a golf cart in poor weather conditions comprising:
   a plurality of independent flexible strips, each of slid flexible strips being of sufficient length to extend from a golf can canopy to a golf cart body located below, each of said flexible strips having a top end, said top end of said flexible strips secured to said golf cart canopy by a mounting member such that a rear edge of one of said flexible strip slightly overlaps a front edge of an adjacent flexible strip so that during forward motion of the golf cart the adjacent flexible stripes remain in position and in contact with each to form a barrier to an outside environment, each of said flexible strips having a bottom end, each of said bottom ends having a magnetically attractable material attached thereto, said magnetically attractable material extending across a portion of said bosom end of said flexible strip; and
   an electromagnetic retrieval system, said retrieval system located on said golf cart body such that each said magnetically attractable material can be magnetically attracted to said golf cart body, thus securing each of said bottom ends of said flexible strips to said golf cart body for maintaining said flexible strips in the overlapping fashion to thereby provide an enclosed environment within said golf cart during operation of said golf cart yet permit quick release of a portion of the flexible strips to permit parting of the flexible strips to provide ingress and egress into the golf cart through said flexible strips without having to first separate said plurality of flexible strips.

2. The enclosure system of claim 1 wherein the flexible strips are made of a clear polyethylene vinyl.

3. The enclosure system of claim 1 wherein said retrieval system comprises electromagnets and an a connecting wiring apparatus, said electromagnets electrically wired via a wire to a golf cart foot pedal so that said electromagnets are activated simultaneously with activation of the golf cart.

4. The enclosure system of claim 1 wherein said retrieval system includes an on-board manually activatable switch which can be operated from Within said golf cart.

5. The enclosure system of claim 1 wherein said enclosure system includes two side panels and fastener means to secure said side panels to said canopy.

6. The enclosure system of claim 1 wherein said magnetically attractable material comprises a metal secured to said flexible strip.

7. An enclosure system to preserve pleasant climate conditions inside a golf cart in poor weather conditions yet permit quick entry and exit to the golf cart comprising:
   a panel for covering an opening in a golf cart for quick ingress and egress with respect to the golf cart, said panel including a plurality of flexible strips each having a front edge and a rear edge with the rear edge of a first strip overlapping the front edge of a flexible strip located rearward of said rear edge with said edges free of any closures to enable the strips to form a barrier to an outside environment and to be partable by action of a golfer moving into or out of the golf cart, magnetically attractable material attached to said strips, and;
   an electromagnetic member to hold said plurality of flexible strips in a closed condition during motion of the golf cart yet permit quick release of a portion of the flexible strips to permit parting of the flexible strips to provide ingress and egress with respect to the golf cart through said panel.

* * * * *